(12) United States Patent
Wang et al.

(10) Patent No.: US 11,417,334 B2
(45) Date of Patent: Aug. 16, 2022

(54) DYNAMIC SPEECH RECOGNITION METHOD AND APPARATUS THEREFOR

(71) Applicant: REALTEK SEMICONDUCTOR CORP., Hsinchu (TW)

(72) Inventors: Mei-Hua Wang, Hsinchu (TW); Ching-Lung Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 135 days.

(21) Appl. No.: 16/942,195

(22) Filed: Jul. 29, 2020

(65) Prior Publication Data

US 2021/0158817 A1    May 27, 2021

(30) Foreign Application Priority Data

Nov. 27, 2019   (TW) .................................. 108143281

(51) Int. Cl.
*G10L 15/22*     (2006.01)
*G10L 15/08*     (2006.01)
*G06F 3/16*      (2006.01)

(52) U.S. Cl.
CPC .............. *G10L 15/22* (2013.01); *G06F 3/165* (2013.01); *G06F 3/167* (2013.01); *G10L 15/08* (2013.01); *G10L 2015/088* (2013.01); *G10L 2015/223* (2013.01); *G10L 2015/227* (2013.01)

(58) Field of Classification Search
CPC ... G10L 15/22; G10L 15/08; G10L 2015/088; G10L 2015/223; G10L 2015/227; G06F 3/165; G06F 3/167
See application file for complete search history.

(56) References Cited

U.S. PATENT DOCUMENTS

| | | | |
|---|---|---|---|
| 9,697,822 B1 * | 7/2017 | Naik | G10L 15/22 |
| 10,949,736 B2 * | 3/2021 | Deisher | G06N 3/0454 |
| 2012/0078397 A1 * | 3/2012 | Lee | G10L 17/00 700/94 |
| 2014/0222436 A1 * | 8/2014 | Binder | G10L 15/26 704/275 |

(Continued)

FOREIGN PATENT DOCUMENTS

| | | | | |
|---|---|---|---|---|
| WO | WO-2011127457 A1 * | 10/2011 | | G10L 17/00 |
| WO | WO-2020056329 A1 * | 3/2020 | | |

*Primary Examiner* — Mohammad K Islam

(74) *Attorney, Agent, or Firm* — Birch, Stewart, Kolasch & Birch, LLP

(57) ABSTRACT

A dynamic speech recognition method includes performing a first stage: detecting sound data by using a digital microphone and storing the sound data in a first memory, generating a human voice detection signal in response to detecting a human voice from the sound data, and determining to selectively perform a second stage or a third stage according to a total effective data volume, a transmission bit rate of the digital microphone and a recognition interval time. In the second stage, the first processing circuit outputs a first command to a second processing circuit, and the second processing circuit instructs a memory access circuit to operate. In the third stage, the first processing circuit outputs a second command to the second processing circuit, and the second processing circuit instructs the memory access circuit to operate, and the second processing circuit determines whether the speech data matches a predetermined speech command.

18 Claims, 4 Drawing Sheets

(56) References Cited

U.S. PATENT DOCUMENTS

| | | | |
|---|---|---|---|
| 2014/0281628 A1* | 9/2014 | Nigam | G06F 1/3206 |
| | | | 713/323 |
| 2016/0232899 A1* | 8/2016 | Chen | G10L 15/22 |
| 2016/0284349 A1* | 9/2016 | Ravindran | G10L 15/285 |
| 2016/0342890 A1* | 11/2016 | Young | G06N 5/04 |
| 2016/0351195 A1* | 12/2016 | Falik | G10L 15/285 |
| 2018/0322871 A1* | 11/2018 | Chuang | G10L 25/84 |
| 2019/0043488 A1* | 2/2019 | Booklet | G10L 15/22 |
| 2020/0219485 A1* | 7/2020 | Chen | G10L 15/08 |

* cited by examiner

DYNAMIC SPEECH RECOGNITION METHOD AND APPARATUS THEREFOR

CROSS-REFERENCE TO RELATED APPLICATION

This non-provisional application claims priority under 35 U.S.C. § 119(a) to Patent Application No. 108143281 in Taiwan, R.O.C. on Nov. 27, 2019, the entire contents of which are hereby incorporated by reference.

BACKGROUND

Technical Field

The present invention relates to a speech detection and recognition technology, and in particular, to a dynamic speech recognition method and an apparatus therefor.

Related Art

In an existing electronic device, a voice assistant technology is widely applied to various fields and supports a voice wake-up function. When the voice assistant is in a standby mode, the voice assistant still needs to listen to a hot word and gives a corresponding response when the hot word appears. Therefore, the voice assistant must be woken up regularly. A processing system of the voice assistant starts up in the standby mode to detect whether a human voice occurs using a speech activity detection circuit, and further performs speech recognition when the human voice occurs, so as to determine whether the hot word exists in the human voice, thereby determining whether system startup of the electronic device is performed or a corresponding operation is performed.

However, when the voice assistant is wakened up for detection in an equal frequency, the voice assistant has poor sensitivity. In addition, the processing system of the voice assistant also needs to be operated in low power to conform to relevant specifications of energy requirements.

SUMMARY

In view of this, a dynamic speech recognition method is provided, including the following: performing a first stage: detecting sound data by using a digital microphone and storing the sound data in a first memory; generating a human voice detection signal in response to detecting a human voice from the sound data; and determining, by using a first processing circuit and according to a total effective data volume, a transmission bit rate of the digital microphone and a recognition interval time, to selectively perform a second stage or a third stage. Performing a second stage: outputting, by the first processing circuit, a first command to a second processing circuit, and instructing, by the second processing circuit and according to the first command, a memory access circuit to transfer the sound data to a second memory to store the sound data as speech data. Performing a third stage, outputting, by the first processing circuit, a second command, and instructing, by the second processing circuit and according to the second command, the memory access circuit to transfer the sound data to the second memory to store the sound data as speech data, and determining, by the second processing circuit, whether the speech data in the second memory matches a predetermined speech command.

A dynamic speech recognition apparatus is further provided, including a digital microphone, a first memory, a speech activity detection circuit, a memory access circuit, a second memory, a first processing circuit and a second processing circuit. The digital microphone is configured to detect sound data. The first memory is electrically connected to the digital microphone for storing the sound data. The speech activity detection circuit is electrically connected to the digital microphone for detecting the sound data and generating a human voice detection signal. The memory access circuit is electrically connected to the first memory for transferring the sound data to the second memory according to the first command to store the sound data as the speech data. The first processing circuit is electrically connected to the speech activity detection circuit. The second processing circuit is electrically connected to the first processing circuit, the second memory and the memory access circuit. The dynamic speech recognition apparatus is configured to perform the foregoing dynamic speech recognition method.

According to some embodiments, when the first processing circuit receives the human voice detection signal, the first processing circuit outputs the first command or the second command after the recognition interval time.

According to some embodiments, the recognition interval time is determined by a budget. When the budget is less than or equal to a target average power consumption*a previous cycle time*⅓, the recognition interval time is 2 seconds; when the budget is greater than the target average power consumption*the previous cycle time*⅓ and less than or equal to the target average power consumption*the previous cycle time*⅔, the recognition interval time is 1.5 seconds; and when the budget is greater than the target average power consumption*the previous cycle time*⅔, the recognition interval time is 1 second.

According to some embodiments, the budget is the target average power consumption*the previous cycle time−(a first average power consumption of the first stage*a first time of the first stage+a second average power consumption of the second stage*a second time of the second stage+a third average power consumption of the third stage*a third time of the third stage). The previous cycle time is equal to a sum of the first time, the second time and the third time.

According to some embodiments, the third average power consumption is greater than the second average power consumption, and the second average power consumption is greater than the first average power consumption.

According to some embodiments, after the human voice detection signal is generated, it is determined whether the first memory is full of the sound data by using the first processing circuit, and a next step proceeds when the first memory is full of the sound data.

In summary, when the dynamic speech recognition is performed, user experience is taken into consideration, and when searching for the predetermined speech command (a hot word) is triggered in a standby mode, average power consumption may be reduced, and a method with better sensitivity is provided.

DETAILED DESCRIPTION

Figure 1:
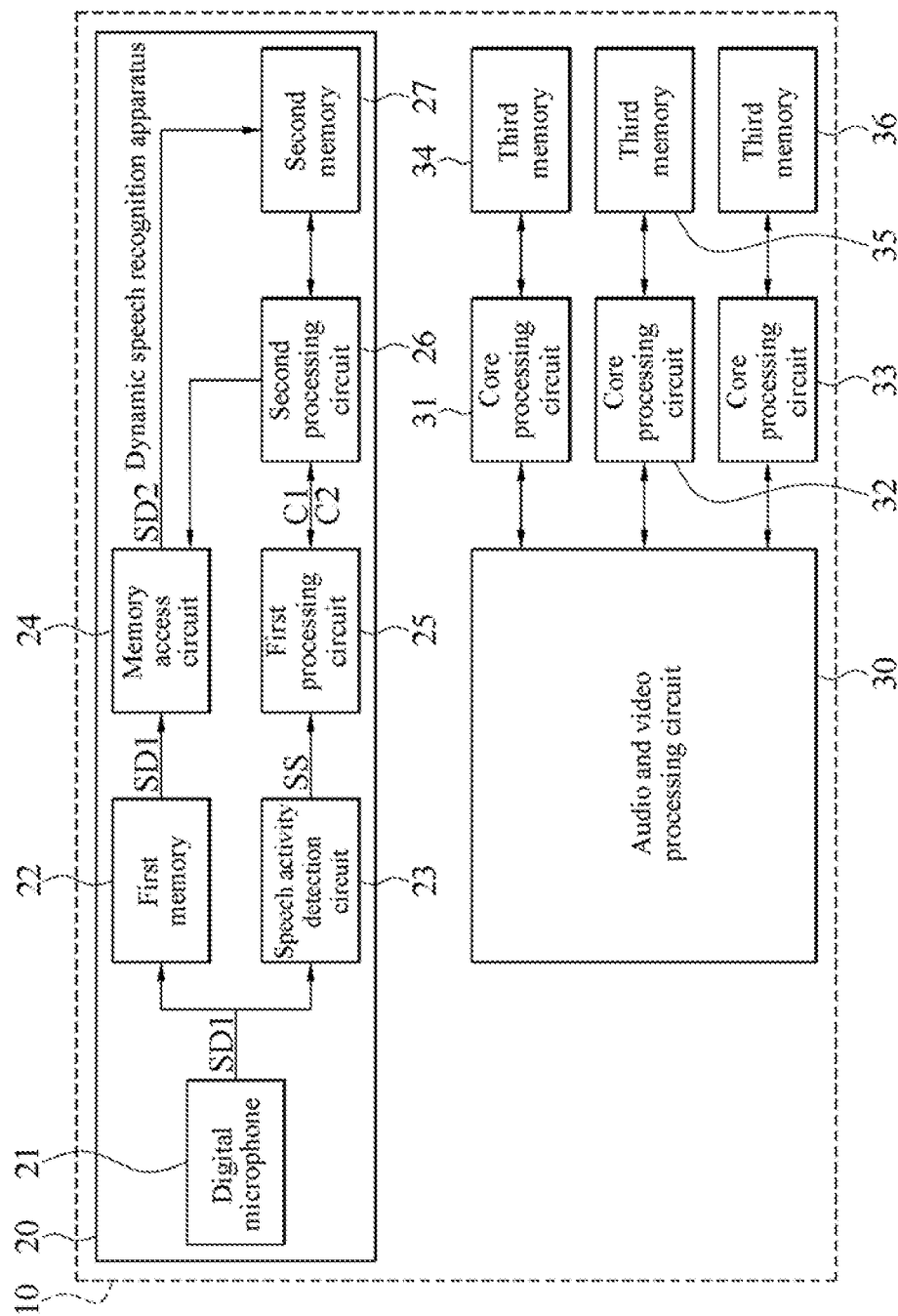
FIG. 1 is a schematic block diagram of an electronic apparatus according to an embodiment of the present invention.

FIG. 1 is a schematic block diagram of an electronic apparatus according to an embodiment of the present invention. Referring to FIG. 1, an electronic apparatus 10 includes a dynamic speech recognition apparatus 20, an audio and video processing circuit 30, a plurality of core processing circuits 31-33 and a plurality of third memories 34-36, the plurality of core processing circuits 31-33 being electrically connected to the third memories 34-36. When the dynamic speech recognition apparatus 20 recognizes a predetermined speech command in a standby mode, the electronic apparatus 10 executes a system startup program, so that the audio and video processing circuit 30, the plurality of core processing circuits 31-33 and the plurality of third memories 34-36 may operate with each other to play an audio and video signal received by the electronic apparatus 10. In an embodiment, the electronic apparatus 10 may be a television, but is not limited thereto.

The dynamic speech recognition apparatus 20 includes a digital microphone 21, a first memory 22, a speech activity detection circuit 23, a memory access circuit 24, a first processing circuit 25, a second processing circuit 26 and a second memory 27. The digital microphone 21 is configured to detect sound data SD1. The first memory 22 is electrically connected to the digital microphone 21 to be configured to store the sound data SD1. In an embodiment, the first memory 22 may be, but is not limited to, a static random access memory (SRAM).

The speech activity detection circuit 23 is electrically connected to the digital microphone 21 to be configured to detect the sound data SD1 and generate a human voice detection signal SS. In an embodiment, the speech activity detection circuit 23 may be, but is not limited to, a speech recognition chip or a speech recognition processing circuit.

The memory access circuit 24 is electrically connected to the first memory 22 and the second memory 27 to transfer the sound data SD1 to the second memory 27 according to a first command, so as to store the sound data SD1 as speech data SD2. In an embodiment, the memory access circuit 24 may be, but is not limited to, a direct memory access (DMA) circuit, and the second memory 27 may be, but is not limited to, a dynamic random access memory (DRAM).

The first processing circuit 25 is electrically connected to the speech activity detection circuit 23 to correspondingly generate a first command C1 or a second command C2 according to the human voice detection signal SS. The second processing circuit 26 is electrically connected to the first processing circuit 25, the second memory 27 and the memory access circuit 24. The second processing circuit 26 instructs, according to the first command C1, the memory access circuit 24 to transfer the sound data SD1 to the second memory 27 to store the sound data as speech data SD2. Alternatively, the second processing circuit 26 instructs, according to the second command C2, the memory access circuit 24 to transfer the sound data SD1 to the second memory 27 to store the sound data as the speech data SD2, and it is determined that whether the speech data SD2 in the second memory 27 matches a predetermined speech command. In an embodiment, the first processing circuit 25 may use a microcontroller with a relatively low power consumption, for example, an 8051 microcontroller, but the present invention is not limited thereto. The second processing circuit 26 may be various types of processing circuits that use a general microprocessor, a microcontroller and a central processing unit, but the present invention is not limited thereto.

In an embodiment, the first command C1 or the second command C2 is a command to modify a sharing state.

Figure 2:
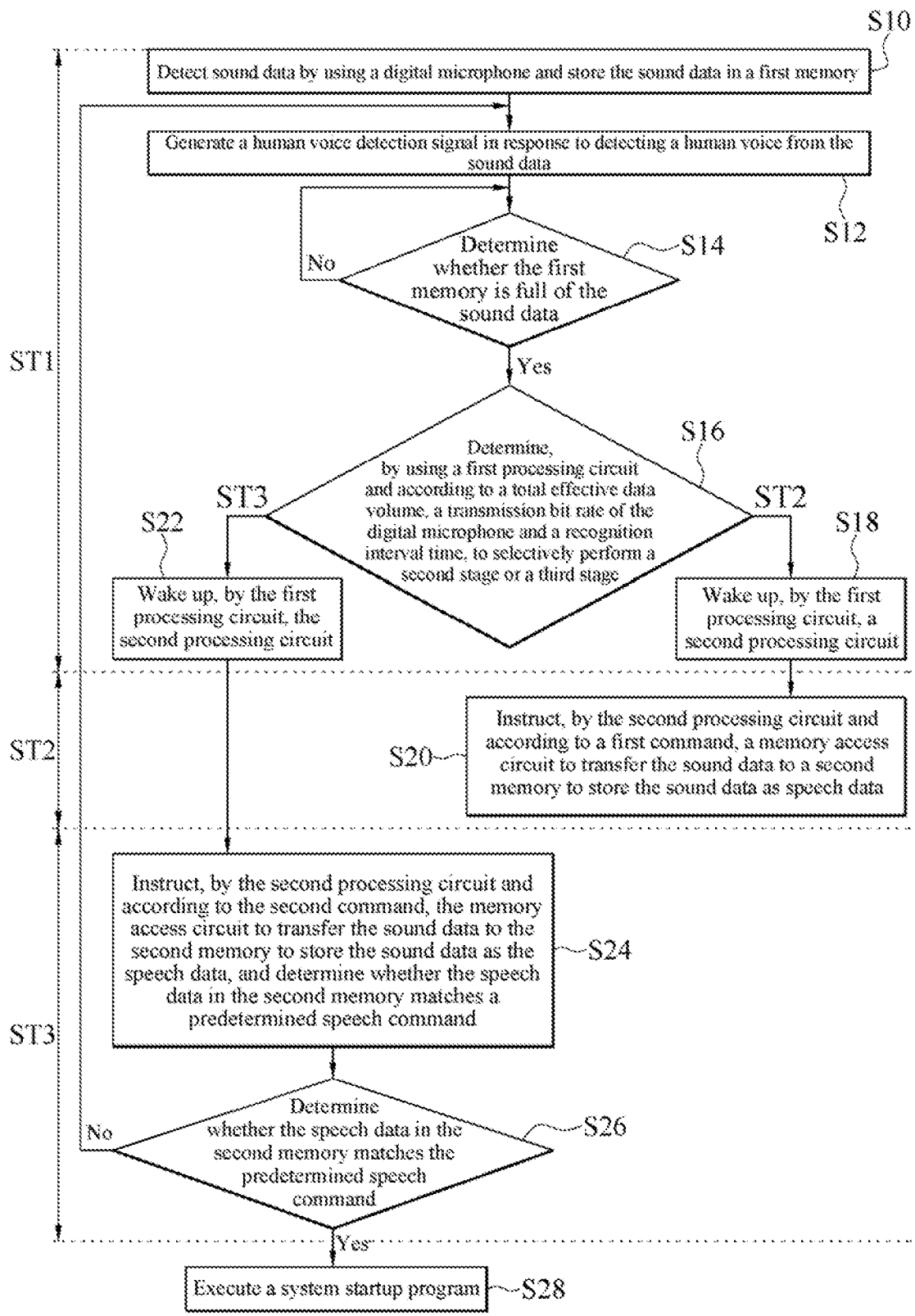
FIG. 2 is a schematic flowchart of a dynamic speech recognition method according to an embodiment of the present invention.
Figure 3:
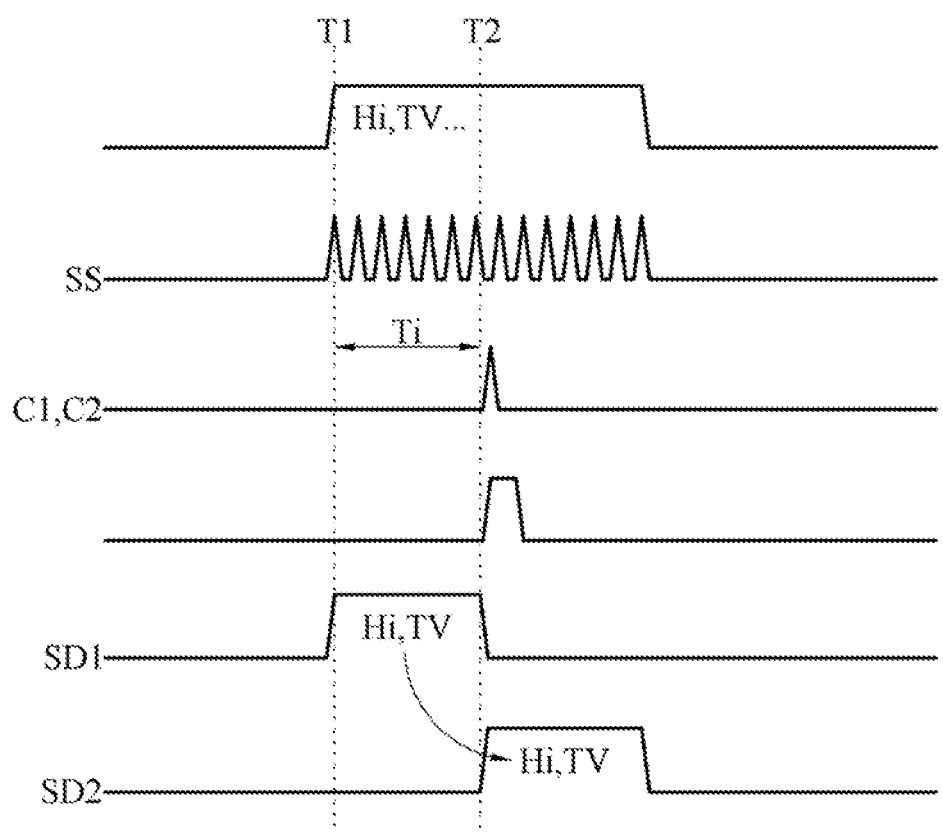
FIG. 3 is a schematic waveform diagram of a dynamic speech recognition apparatus according to an embodiment of the present invention.

FIG. 2 is a schematic flowchart of a dynamic speech recognition method according to an embodiment of the present invention. FIG. 3 is a schematic waveform diagram of a dynamic speech recognition apparatus according to an embodiment of the present invention. Referring to FIG. 1, FIG. 2 and FIG. 3, the dynamic speech recognition method includes performing a first stage ST1 (step S10-step S18, step S22) and performing a second stage ST2 (step S20) or a third stage ST3 (step S24-step S26) using the dynamic speech recognition apparatus 20. The stages are described in detail below.

During the performing of the first stage ST1 (a pure standby stage), as shown in step S10, the digital microphone 21 is used to detect the sound data SD1 and store the sound data SD1 in the first memory 22. As shown in step S12, the speech activity detection circuit 23 detects whether a human voice occurs in the sound data SD1, and when a human voice is detected in the sound data SD1, the speech activity detection circuit 23 is triggered to generate a human voice detection signal SS, and transmits the sound detection signal SS to the first processing circuit 25. As shown in step S14, it is determined that whether the first memory 22 is full of the sound data SD1 by using the first processing circuit 25. When the first memory 22 is full of the sound data SD1, proceed to a next step S16, to ensure that sufficient sound data SD1 is used to perform subsequent steps. As shown in step S16, it is determined, by using the first processing circuit 25 and according to the total effective data volume, a transmission bit rate of the digital microphone 21, and a recognition interval time Ti, that a second stage ST2 (a DMA stage) or a third stage ST3 (a speech recognition stage) is selectively performed.

In an embodiment, a target average power consumption, a first average power consumption of the first stage ST1, a second average power consumption of the second stage ST2 and a third average power consumption of the third stage ST3 are known, and time spent by each stage in a previous cycle time T is obtained, including a first time Ta of the first stage ST1, a second time Tb of the second stage ST2 and a third time Tc of the third stage ST3. The previous cycle time T is equal to a sum of the first time Ta, the second time Tb and the third time Tc, that is, T=Ta+Tb+Tc. In an embodiment, the cycle time T may be, but is not limited to, 16 seconds. Therefore, a budget related to power usage may be obtained using the foregoing parameters. The budget is the target average power consumption*the previous cycle time T−(the first average power consumption of the first stage ST1*the first time Ta of the first stage ST1+the second average power consumption of the second stage ST2*the second time Tb of the second stage ST2+the third average power consumption of the third stage ST3*the third time Tc of the third stage ST3).

After the budget is obtained, the recognition interval time Ti may be dynamically determined according to the budget. In detail, when the budget is less than or equal to the target average power consumption*the previous cycle time T*⅓, the recognition interval time Ti is determined to be 2 seconds. When the budget is greater than the target average power consumption*the previous cycle time T*⅓ and less than or equal to the target average power consumption*the previous cycle time T*⅔, the recognition interval time Ti is determined to be 1.5 seconds. When the budget is greater than the target average power consumption*the previous cycle time T*⅔, the recognition interval time Ti is determined to be 1 second. Next, it is known that the total effective data volume is a sum of effective data amount of the first memory 22 and effective data amount of the second memory 27, and the transmission bit rate of the digital microphone 21 is known. Therefore, when the total effective data volume is less than a product of the transmission bit rate of the digital microphone 21 and the recognition interval time, the first processing circuit 25 determines to perform the DMA stage of the second stage ST2. When the total effective data volume is greater than or equal to the product of the transmission bit rate of the digital microphone 21 and the recognition interval time, the first processing circuit 25 determines to perform the speech recognition stage of the third stage ST3.

When the first processing circuit 25 determines to perform the second stage ST2, as shown in step S18, the first processing circuit 25 first wakes up the second processing circuit 26, and then enters the second stage ST2. In the second stage ST2, as shown in step S20, the first processing circuit 25 outputs the first command C1 to the second processing circuit 26, and the second processing circuit 26 instructs, according to the first command C1, the memory access circuit 24 to transfer the sound data SD1 in the first memory 22 to the second memory 27 to store the sound data as the speech data SD2. In the second stage ST2, only the speech data SD2 is converted into the second memory 27 through the memory access circuit 24, without performing speech recognition.

When the first processing circuit 25 determines to perform the third stage ST3, as shown in step S22, the first processing circuit 25 first wakes up the second processing circuit 27, and then enters the third stage ST3. In the third stage ST3, as shown in step S24, the first processing circuit 25 outputs the second command C2 to the second processing circuit 26, and the second processing circuit 26 further instructs, according to the second command C2, the memory access circuit 24 to transfer the sound data SD1 in the first memory 22 to a second memory 27 to store the sound data as speech data SD2, and it is confirmed whether the speech data SD2 in the second memory 27 matches a predetermined speech command. As shown in step S26, it is determined that whether the speech data SD2 in the second memory 27 matches a predetermined speech command by using the second processing circuit 26. If it is determined that the speech data SD2 matches a predetermined speech command, as shown in step S28, a system startup program is executed, to wake up other circuits, including an audio and video processing circuit 30, core processing circuits 31-33 and third memories 34-36, etc. to perform system startup.

Figure 4:
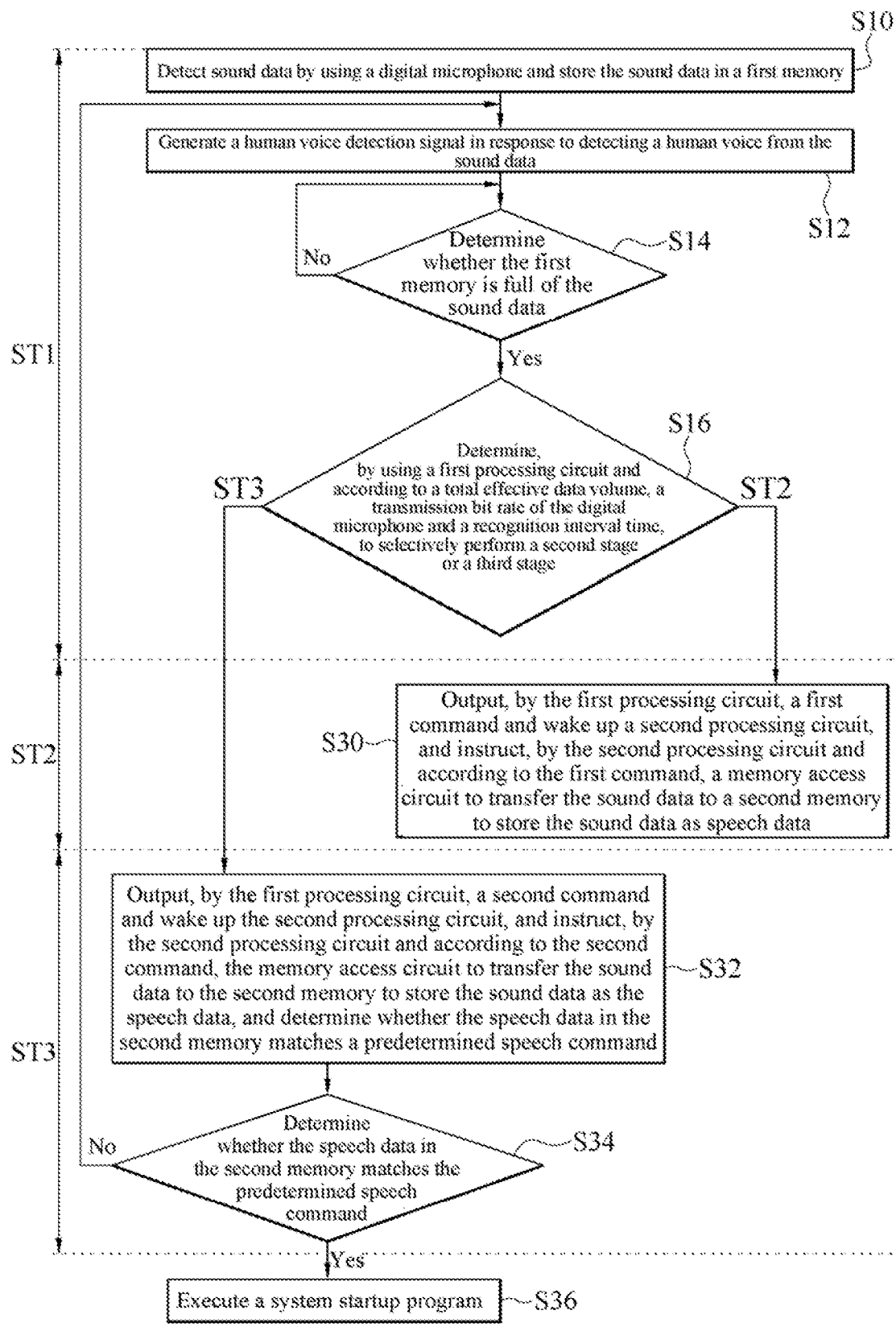
FIG. 4 is a schematic flowchart of a dynamic speech recognition method according to another embodiment of the present invention.

FIG. 4 is a schematic flowchart of a dynamic speech recognition method according to another embodiment of the present invention. Referring to FIG. 1, FIG. 3 and FIG. 4, the dynamic speech recognition method includes performing a first stage ST1 (step S10-step S16) and a second stage ST2 (step S30) or a third stage ST3 (step S32-step S34) using the dynamic speech recognition apparatus 20. The stages are described in detail below.

During the performing of the first stage ST1 (a pure standby stage), as shown in step S10, the digital microphone 21 is configured to detect the sound data SD1 and store the sound data SD1 in the first memory 22. As shown in step S12, the speech activity detection circuit 23 detects whether a human voice occurs in the sound data SD1, and when the human voice is detected, the speech activity detection circuit 23 is triggered to generate a human voice detection signal SS that is transmitted to the first processing circuit 25. As shown in step S14, it is determined that whether the first memory 22 is full of the sound data SD1 by using the first processing circuit 25. When the first memory 22 is full of the sound data SD1, proceed to a next step S16, to ensure that sufficient sound data SD1 is used to perform subsequent steps. As shown in step S16, it is determined, by using the first processing circuit 25 and according to the total effective data volume, a transmission bit rate of the digital microphone 21, and a recognition interval time Ti, that a second stage ST2 (a DMA stage) or a third stage ST3 (a speech recognition stage) is selectively performed.

When the first processing circuit 25 determines to perform the second stage ST2, as shown in step S30, in the second stage ST2, the first processing circuit 25 outputs the first command C1 and wakes up the second processing circuit 26, and the second processing circuit 26 instructs, according to the first command C1, the memory access circuit 24 to transfer the sound data SD1 in the first memory 22 to the second memory 27 to store the sound data as the speech data SD2.

When the first processing circuit 25 determines to perform the third stage ST3, as shown in step S32, in the third stage ST3, the first processing circuit 25 outputs the second command C2 and wakes up the second processing circuit 26, and the second processing circuit 26 instructs, according to the second command C2, the memory access circuit 24 to transfer the sound data SD1 in the first memory 22 to the second memory 27 so as to store the sound data as the speech data SD2, and it is determined whether the speech data SD2 in the second memory 27 matches a predetermined speech command. As shown in step S34, it is determined that whether the speech data SD2 in the second memory 27 matches the predetermined speech command by using the second processing circuit 26. If it is determined that the speech data SD2 matches the predetermined speech command, as shown in step S36, a system startup program is executed to wake up all circuits for system startup.

The plurality of steps (S10-S26 and S30-S34) of the foregoing dynamic speech recognition method is merely illustrative, and is not limited to the sequence in the foregoing example. Various operations under the dynamic speech recognition method may be appropriately added, replaced, omitted or performed in different orders without departing from the spirit and scope of the present invention.

In an embodiment, when the first processing circuit 25 receives a human voice detection signal SS, the first processing circuit 25 outputs the first command C1 or the second command C2 after the recognition interval time Ti. As shown in FIG. 1 and FIG. 3, when the first processing circuit 25 receives the human voice detection signal SS at a time T1, the first processing circuit 25 outputs the first command C1 or the second command C2 at a time T2 after the recognition interval time Ti. The recognition interval time Ti may be dynamically determined based on the foregoing manner to ensure that the received sound data SD1 is sufficient to reflect the predetermined speech command before the second processing circuit 26 and the second memory 27 are enabled. Therefore, a low-power operation is met to conform to an energy-related specification.

In an embodiment, if a keyword set in the predetermined speech command is "Hi, TV", referring to FIG. 1 and FIG. 3, at the time T1, the digital microphone 21 detects an external sound and generates sound data SD1, and the first memory 22 stores the sound data SD1. For example, the digital microphone 21 detects that a user speaks a speech command such as "Hi, TV . . . " to the dynamic speech recognition apparatus 20. In this case, the speech activity detection circuit 23 determines that the sound data SD1 has a human voice to output a human voice detection signal SS. At the time T2, the first processing circuit 25 outputs the first command C1 or the second command C2. The second processing circuit 26 and the second memory 27 are also enabled. In this case, the second processing circuit 26 instructs, according to the first command C1 or the second command C2, the memory access circuit 24 to be enabled, so as transfer the sound data SD1 to the second memory 27 to store the sound data as the speech data SD2. Therefore, the second processing circuit 26 may analyze the speech data SD2 to determine whether the speech data SD2 matches the predetermined speech command "Hi, TV", and the second processing circuit 26 may determine that the speech data SD2 matches the predetermined speech command to wake up other circuits for executing the system startup program.

In an embodiment, in the first stage ST1, the digital microphone 21, the first memory 22, the speech activity detection circuit 23 and the first processing circuit 25 in the dynamic speech recognition apparatus 20 are used. In the second stage ST2, the digital microphone 21, the first memory 22, the speech activity detection circuit 23, the memory access circuit 24, the first processing circuit 25, a part of the second processing circuit 26 (only a part of functions of the second memory being activated) and the second memory 27 in the dynamic speech recognition apparatus 20 are used. In the third stage ST3, the digital microphone 21, the first memory 22, the speech activity detection circuit 23, the memory access circuit 24, the first processing circuit 25, the second processing circuit 26 and the second memory 27 in the dynamic speech recognition apparatus 20 are used. Therefore, third average power consumption of the third stage ST3 is greater than second average power consumption of the second stage ST2, and the second average power consumption is greater than the first average power consumption of the first stage ST1. For example, if the power consumption corresponding to the first stage ST1 is about 0.5 watts, and the power consumption corresponding to the third stage ST3 is 4 watts, the power consumption corresponding to the second stage ST2 is between 0.5 watts and 4 watts.

Therefore, according to the present invention, the budget may be determined according to the time (the first time, the second time and the third time) spent in each stage in the previous cycle time T and the average power consumption of each stage, to dynamically determine the recognition interval time Ti according to the budget, thereby determining whether speech data is to be recognized (the second stage ST2 or the third stage ST3 being performed). Therefore, the speech recognition may be dynamically performed according to the actual power consumption. Accordingly, according to the present invention, user experience is taken into consideration when the dynamic speech recognition is performed, and searching for the predetermined speech command is triggered in the standby mode, to reduce the average power consumption, thereby providing a method with better sensitivity.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A dynamic speech recognition method, comprising:
performing a first stage:
detecting sound data by using a digital microphone and storing the sound data in a first memory;
generating a human voice detection signal in response to detecting a human voice from the sound data; and
determining, by using a first processing circuit and according to a total effective data volume, a transmission bit rate of the digital microphone and a recognition interval time, to selectively perform a second stage or a third stage;
performing the second stage:
outputting, by the first processing circuit, a first command to a second processing circuit, and instructing, by the second processing circuit, according to the first command, a memory access circuit to transfer the sound data to a second memory to store the sound data as speech data; and
performing the third stage:
outputting, by the first processing circuit, a second command to the second processing circuit, instructing, by the second processing circuit, according to the second command, the memory access circuit to transfer the sound data to the second memory to store the sound data as the speech data, and determining, by the second processing circuit, whether the speech data in the second memory matches a predetermined speech command;
wherein when the total effective data volume is less than a product of the transmission bit rate of the digital microphone and the recognition interval time, the first processing circuit determines to perform the second stage; and when the total effective data volume is greater than or equal to the product of the transmission bit rate of the digital microphone and the recognition interval time, the first processing circuit determines to perform the third stage, the total effective data volume being a sum of an effective data volume of the first memory and an effective data volume of the second memory.

2. The dynamic speech recognition method according to claim 1, wherein when the first processing circuit receives the human voice detection signal, the first processing circuit outputs the first command or the second command after the recognition interval time.

3. The dynamic speech recognition method according to claim 2, wherein the recognition interval time depends on a budget, when the budget is less than or equal to a target average power consumption * a previous cycle time * ⅓, the recognition interval time being 2 seconds; when the budget is greater than the target average power consumption * the previous cycle time * ⅓ and less than or equal to the target average power consumption * the previous cycle time * ⅔, the recognition interval time being 1.5 seconds; and when the budget is greater than the target average power consumption * the previous cycle time * ⅔, the recognition interval time being 1 second.

4. The dynamic speech recognition method according to claim 3, wherein the budget is the target average power consumption * the previous cycle time (first average power consumption of the first stage * a first time of the first stage+second average power consumption of the second stage * a second time of the second stage+third average power consumption of the third stage * a third time of the third stage), the previous cycle time being equal to a sum of the first time, the second time, and the third time.

5. The dynamic speech recognition method according to claim 4, wherein the third average power consumption is greater than the second average power consumption, and the second average power consumption is greater than the first average power consumption.

6. The dynamic speech recognition method according to claim 1, wherein after the step of generating the human voice detection signal, the method further comprises: determining whether the first memory is full of the sound data, and performing a next step when the first memory is full of the sound data.

7. The dynamic speech recognition method according to claim 1, wherein during performing of the first stage, after the step of determining to selectively perform the second stage or the third stage, the method further comprises: waking up, by the first processing circuit, the second processing circuit.

8. The dynamic speech recognition method according to claim 1, wherein when the first processing circuit outputs the first command or the second command, the first processing circuit wakes up the second processing circuit.

9. The dynamic speech recognition method according to claim 1, wherein when the speech data matches the predetermined speech command, a system startup program is executed.

10. A dynamic speech recognition apparatus, comprising:
a digital microphone configured to detect sound data;
a first memory electrically connected to the digital microphone for storing the sound data;
a speech activity detection circuit electrically connected to the digital microphone for detecting the sound data and generating a human voice detection signal;
a memory access circuit electrically connected to the first memory, the memory access circuit transferring the sound data to a second memory to store the sound data as speech data;
a first processing circuit electrically connected to the speech activity detection circuit; and
a second processing circuit electrically connected to the first processing circuit, the second memory, and the memory access circuit; wherein
the dynamic speech recognition apparatus is configured to perform the following steps:
performing a first stage:
detecting the sound data by using the digital microphone and storing the sound data in the first memory;
generating, by the speech activity detection circuit, the human voice detection signal in response to detecting a human voice from the sound data; and
determining, by using the first processing circuit and according to a total effective data volume, a transmission bit rate of the digital microphone, and a recognition interval time, to selectively perform a second stage or a third stage;
performing the second stage:
outputting, by the first processing circuit, a first command to the second processing circuit, and instructing, by the second processing circuit, according to the first command, the memory access circuit to transfer the sound data to the second memory to store the sound data as the speech data; and
performing the third stage:
outputting, by the first processing circuit, a second command to the second processing circuit, instructing, by the second processing circuit, according to the second command, the memory access circuit to transfer the sound data to the second memory to store the sound data as the speech data, and determining, by the second processing circuit, whether the speech data in the second memory matches a predetermined speech command;
wherein when the total effective data volume is less than a product of the transmission bit rate of the digital microphone and the recognition interval time, the first processing circuit determines to perform the second stage; and when the total effective data volume is greater than or equal to the product of the transmission bit rate of the digital microphone and the recognition interval time, the first processing circuit determines to perform the third stage, the total effective data volume being a sum of an effective data volume of the first memory and an effective data volume of the second memory.

11. The dynamic speech recognition apparatus according to claim 10, wherein when the first processing circuit receives the human voice detection signal, the first processing circuit outputs the first command or the second command after the recognition interval time.

12. The dynamic speech recognition apparatus according to claim 11, wherein the recognition interval time depends on a budget, when the budget is less than or equal to the target average power consumption * a previous cycle time * $\frac{1}{3}$, the recognition interval time being 2 seconds; when the budget is greater than the target average power consumption * the previous cycle time * $\frac{1}{3}$ and less than or equal to the target average power consumption * the previous cycle time * $\frac{2}{3}$, the recognition interval time being 1.5 seconds; and when the budget is greater than the target average power consumption * the previous cycle time * $\frac{2}{3}$, the recognition interval time being 1 second.

13. The dynamic speech recognition apparatus according to claim 12, wherein the budget is the target average power consumption * the previous cycle time–(first average power consumption of the first stage * a first time of the first stage+second average power consumption of the second stage * a second time of the second stage+third average power consumption of the third stage * a third time of the third stage), the previous cycle time being equal to a sum of the first time, the second time, and the third time.

14. The dynamic speech recognition apparatus according to claim 13, wherein the third average power consumption is greater than the second average power consumption, and the second average power consumption is greater than the first average power consumption.

15. The dynamic speech recognition apparatus according to claim 10, wherein after the speech activity detection circuit generates the human voice detection signal, it is determined whether the first memory is full of the first sound data by using the first processing circuit, and a next step is performed when the first memory is full of the first sound data.

16. The dynamic speech recognition apparatus according to claim 10, wherein during the performing of the first stage, after it is determined, by using the first processing circuit, that the second stage or the third stage is selectively performed, the first processing circuit wakes up the second processing circuit.

17. The dynamic speech recognition apparatus according to claim 10, wherein when the first processing circuit outputs the first command or the second command, the first processing circuit wakes up the second processing circuit.

18. The dynamic speech recognition apparatus according to claim 10, wherein when the speech data matches the predetermined speech command, a system startup program is executed.

\* \* \* \* \*